(12) United States Patent
Larkin

(10) Patent No.: US 8,191,818 B2
(45) Date of Patent: Jun. 5, 2012

(54) METHOD FOR RECOVERING A RELATIVELY SLOWER MOVING VEHICLE

(75) Inventor: Louis J. Larkin, Palm Beach Gardens, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 874 days.

(21) Appl. No.: 12/270,509

(22) Filed: Nov. 13, 2008

(65) Prior Publication Data

US 2009/0127387 A1 May 21, 2009

Related U.S. Application Data

(60) Provisional application No. 60/988,407, filed on Nov. 15, 2007.

(51) Int. Cl.
*B64C 37/02* (2006.01)
*B64D 5/00* (2006.01)
*B63B 21/56* (2006.01)
*B63B 35/40* (2006.01)
*B64G 1/64* (2006.01)

(52) U.S. Cl. ... 244/1 TD; 244/2; 244/172.4; 244/110 C; 114/253; 114/258

(58) Field of Classification Search ............... 244/1 TD, 244/2, 3, 110 C, 110 F, 135 A, 158.2, 172.4, 244/172.5; 114/258, 259, 253; 258/1.4
See application file for complete search history.

(56) References Cited

U.S. PATENT DOCUMENTS

| | | | | |
|---|---|---|---|---|
| 2,193,312 A | * | 3/1940 | Cobham et al. | 258/1.4 |
| 3,448,712 A | * | 6/1969 | Adams, Jr. et al. | 114/259 |
| 4,790,497 A | * | 12/1988 | Yoffe | 244/115 |
| 5,088,663 A | * | 2/1992 | Henson | 244/137.1 |
| 6,523,783 B2 | * | 2/2003 | Lounge et al. | 244/172.4 |
| 6,824,102 B2 | * | 11/2004 | Haggard | 244/110 F |
| 2010/0237183 A1 | * | 9/2010 | Wilson et al. | 244/3 |
| 2011/0006151 A1 | * | 1/2011 | Beard | 244/3 |

* cited by examiner

*Primary Examiner* — Joseph W Sanderson
(74) *Attorney, Agent, or Firm* — DeMont & Breyer, LLC

(57) ABSTRACT

A method whereby a relatively faster-moving vessel recovers a relatively-slower moving vehicle includes, in some embodiments, causing a first faster-moving vehicle to move along a first circular path, deploying a cable radially inward from the first circular path such that a free end of the cable circumscribes a second circular path having a radius smaller than that of the first circular path, attracting a second slower-moving vehicle to the free end of the cable, and coupling the second vehicle to the cable.

20 Claims, 3 Drawing Sheets

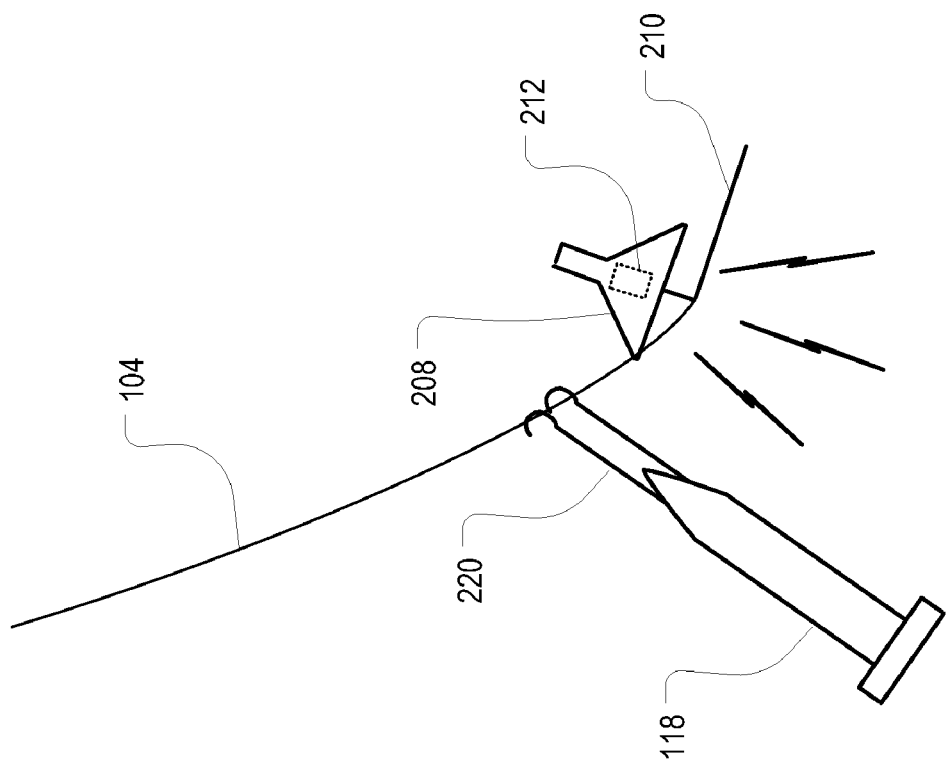

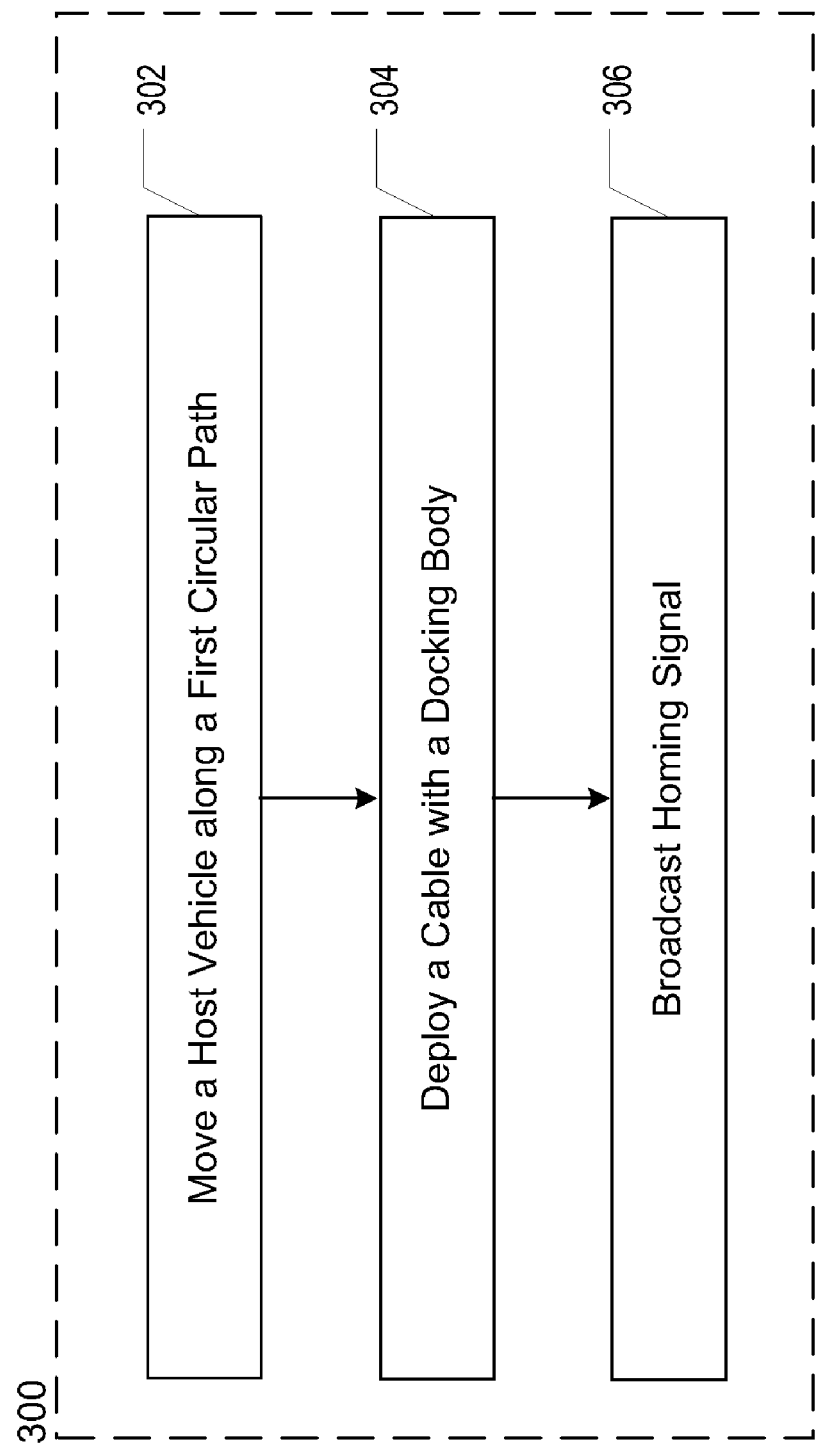

METHOD FOR RECOVERING A RELATIVELY SLOWER MOVING VEHICLE

STATEMENT OF RELATED CASES

This case claims priority of U.S. Provisional Patent Application 60/988,407 filed on Nov. 15, 2007.

FIELD OF THE INVENTION

The present invention relates to small unmanned vehicles in general, and, more particularly, to a method for recovering such vehicles.

BACKGROUND OF THE INVENTION

In recent years, small unmanned vehicles have been used to supplement or supplant many current operator functions on seafaring vessels and aircraft. They are used to reduce platform size, manpower, and budgets, and to minimize the number of personnel exposed to hostile action.

These unmanned vehicles include both underwater vehicles (UUVs) and aerial vehicles (UAVs). UUVs and UAVs often operate in conjunction with a host vehicle, which is usually either a larger ship or aircraft. UUVs and UAVs are typically deployed from their larger host vehicle via a straightforward and uncomplicated operation. On the other hand, depending upon mission specifics, recovery of a UUV or UAV by the larger host vehicle is anything but simple.

One problem that confounds recovery is that the maximum sustained speed for many small unmanned vehicles is often less than the minimum controllable speed for the larger recovery vehicle. That is true for both seafaring and aerial hosts.

A larger vessel could deploy a cable to catch a UUV. But the cable would be hard to control and, in view of the greater speed of the larger vessel, the shock of being snared could damage the UUV. Likewise, a net could be used by a host aircraft to snare a UAV, but the shock occasioned by the rapid deceleration of the captured UAV can damage it.

Another way to recover a UUV or UAV is to permit it to go dead in the water. This would require that a UAV ditch in the water. UAVs are often fragile and a water landing, especially in rough seas, could damage it. In the case of a UUV, the UUV would simply stop moving. If the UUV's host is a remote multi-mission vehicle (RMMV), this will be problematic, because although quite stable at speed, the RMMV is unstable (and vulnerable) when stationary.

As a consequence, there is a need for a method by which a relatively faster moving vehicle (e.g., host aircraft, host ship, etc.) can recover a relatively slower moving vehicle (e.g., UAV, UUV, etc.).

SUMMARY OF THE INVENTION

The present invention provides a method whereby a relatively faster-moving vehicle recovers a relatively slower-moving vehicle.

In accordance with the illustrative embodiment, a relatively faster-moving and larger host vehicle, either a ship or an aircraft, deploys a cable. In the illustrative embodiment, the cable has a docking body near its free end. In some embodiments, the docking body comprises a winglet, a catch rod, and a target transponder that provides a homing beacon. In known fashion, the winglet generates a laterally-directed force that causes the cable to move off to one side of the host vehicle.

With the cable is deployed, the host vehicle moves in a circular path at or near its minimum speed. The winglet is designed to cause the cable to extend radially inward from the circular path followed by the host vehicle. As the host vehicle moves along its circular path, the free end of cable/docking body also circumscribes a circular path. The circular path that is circumscribed by the docking body is concentric with the circular path being followed by the host vehicle, but has a smaller radius. Since the docking body is flying at the same angular or rotational velocity as the host vehicle, but at a decreased radius, the docking body moves more slowly than the host vehicle.

The slower-moving, smaller vehicle follows the smaller circular path as it tracks the homing beacon on the docking body. Given the speed limitations of the relatively slower-moving vehicle, a sufficient length of cable is deployed to ensure that the relatively slower-moving vehicle, following the smaller circular path, will be able to exceed the speed of the docking body. In other words, given the smaller-radius circular path that it follows, the maximum sustained speed of the relatively slower-moving vehicle permits it to move at an angular or rotational speed that is greater than that of the host vehicle. As a consequence, the relatively slower-moving vehicle can overtake the docking body at the free end of the cable. And that is the case even though the maximum sustainable speed of the relatively slower-moving vessel may be less than the minimum controllable speed of the relatively faster-moving vessel.

Once it catches up to the docking body, the slower, smaller vehicle couples itself to the docking body (e.g., either to the winglet, catch rod, a cable that is trailed from the docking body, the deployed cable itself, etc.). After the smaller vehicle is captured, the cable is reeled in, if desired.

BRIEF DESCRIPTION OF THE DRAWINGS

FIG. 2 depicts further detail of the recovery operation.

FIG. 3 depicts a flow diagram of a method in accordance with the illustrative embodiment of the present invention.

DETAILED DESCRIPTION

Figure 1:
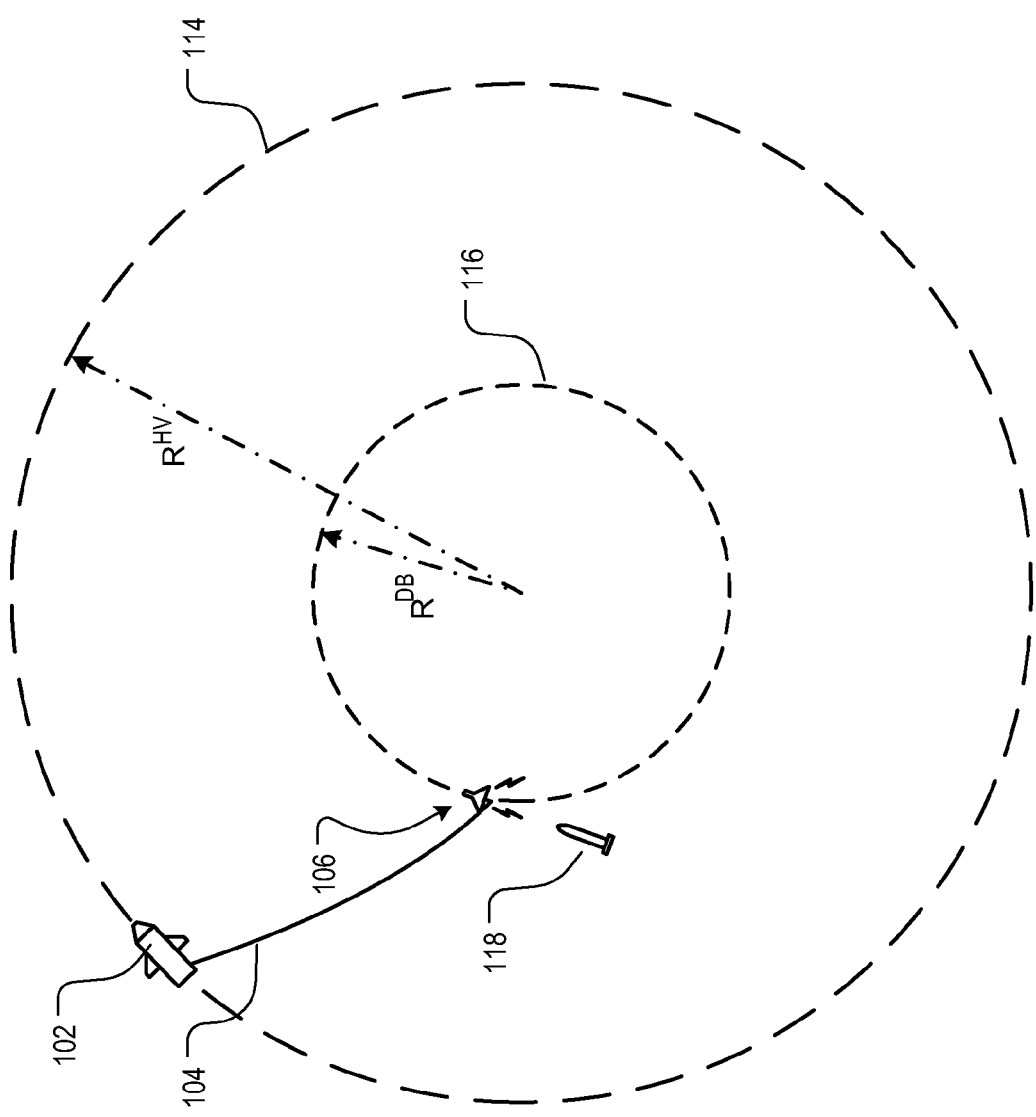
FIG. 1 depicts a method by which a relatively faster-moving vehicle can be used to recover a relatively slower-moving vehicle.

FIG. 1 depicts the recovery of a smaller, slower-moving vehicle by a host vehicle, which is typically larger and faster moving. The vehicles can be moving through water (i.e., sea-faring vessels) or they can be moving through air (i.e., aircraft).

Host vehicle 102 moves along a circular path 114. In some embodiments, the host vehicle is moving at or near its minimum controllable speed. Cable 104 is deployed from host vehicle 102. Docking body 106 is attached to cable 104 near its free end.

In some embodiments, docking body 106 comprises winglet 208, catch rod 210, and target transponder 212, as depicted in FIG. 2. Winglet 208 is used to "steer" the cable. In particular, the winglet is designed to generate a laterally-directed force, in known fashion. Catch rod 210 provides a potential capture site for slower-moving vehicle 118. Target transponder 212 broadcasts a homing signal that can be received by relatively slower-moving vehicle 118.

As the host vehicle moves, dragging cable 104 and docking body 106 with it, the laterally-directed force generated by the winglet causes the cable to move to one side of host vehicle 102. More specifically, the winglet is designed to cause cable 104 to move radially inward from circular path 114, in known fashion.

Being dragged radially inward of host vehicle 102, docking body 106 circumscribes circular path 116 having a smaller radius and hence smaller circumference than circular path 114. Since docking body 106 is moving at the same rotational velocity (e.g., revolutions per minute, etc.) as host vehicle 102, but along a shorter path (i.e., path 116), the docking body moves more slowly than the host vehicle. In fact, the speed of docking body 106 is reduced from that of host vehicle 102 by the ratio of the radius of path 114 to the radius of path 116.

In some embodiments, vehicle 118 is a UUV and in some other embodiments, vehicle 118 is a UAV. In either case, vehicle 118 is able to home-in on the transponder in docking body 106.

A sufficient length of cable 104 is deployed to ensure that the radius of smaller circular path 116 is such that relatively slower-moving vehicle 118 will be capable of exceeding the speed of docking body 106. In other words, even though the maximum sustained speed achievable by relatively slower-moving vehicle 118 might be less than the minimum controllable speed of the relatively faster-moving vessel, the relatively slower-moving vehicle can be faster than docking body 106. This is simply a matter of ensuring that the radius (circumference) of circular path 116 is appropriately reduced in size relative to circular path 114. The issue of an appropriate reduction in size is discussed further below.

Once it catches up to the free end of cable, vehicle 118 couples to thereto. The language "couples to the free end of cable 104" (or its variants) means that a hook, etc., from vehicle 118 engages cable 104 near its free end, either by attaching to a fixture such as the winglet, a hook that is coupled to the winglet or cable, etc., or by attaching to cable 104 itself. Once smaller vehicle 118 is captured, cable 104 is reeled in, as appropriate.

FIG. 2 depicts further detail of the capture operation. In the embodiment that is depicted in FIG. 2, vehicle 118 includes hooks 220. In the scenario depicted, hooks 220 snare cable 104.

EXAMPLE

Assume that vehicle 118 is a UUV having an operating speed that ranges from about 0.5 kts (knots) to about 4.5 kts. Assume that vehicle 102 is a RMMV having a minimum operating speed of about 5 kts and that is traveling at 7 kts to recover vehicle 118. Assume further that larger circular path 114 circumscribed by vehicle 102 has a radius of 300 meters and that smaller circular path 114 circumscribed by docking body 106 at the free end of cable 104 has a radius of 100 meters.

Based on the assumptions provided, the circumference of path 114 is 1.885 kilometers and the circumference of path 116 is 0.6283 kilometers. Vehicle 102 is traveling at 13 kilometers (km) per hour (1 knot=1.852 km per hour). Vehicle 102 therefore circumnavigates path 114 in 8.7 minutes. As a consequence, docking body 106 likewise completes one revolution of path 116 in 8.7 minutes. Therefore, docking body 106 is traveling at 4.33 km per hour (0.6283 km/8.7 min) or 2.3 kts. Since vehicle 118 is assumed to be capable of traveling of speeds up to about 4.5 kts, it will be able to catch docking body 106.

FIG. 3 depicts a flow diagram of method 300 for recovering a slower moving body in accordance with the illustrative embodiment of the present invention. In operation 302, a host vehicle is moved along a first circular path. In accordance with operation 304, a cable is deployed from the host vehicle. The cable remains radially inward of the host vehicle. Since the host vehicle is flying a circular course, the free end of the cable circumscribes a circular path as well. Since the cable remains radially inward of the host vehicle, this second circular path circumscribed by the free end of the cable will have a smaller circumference (and radius) than the first circular path.

As previously mentioned, the speed of docking body 106 is reduced from that of host vehicle 102 by the ratio of radius $R^{DB}$ of path 116 to radius $R^{HV}$ of path 114. The following relation can therefore be used to describe the conditions for use of the illustrative method described herein:

$$V^S_{MAX} > V^{HV} \times (R^{DB}/R^{HV}) \qquad [1]$$

Wherein:
$V^S_{MAX}$ is the maximum sustainable speed of slower-moving vehicle 118;
$V^{HV}$ is the velocity at which host vehicle 102 is moving during the recovery operation;
$R^{DB}$ is the radius of the circular path circumscribed by docking body 106; and
$R^{HV}$ is the radius of the circular path that host vehicle 102 follows during the recovery operation.

In accordance with the method, a sufficient length of cable is deployed from the host vehicle to ensure that expression [1] is satisfied.

In operation 306, a homing signal is broadcast from the free end of the deployed cable. A vehicle to be recovered homes in on the homing signal. That vehicle couples to the free end of cable 104 (e.g., to the winglet, hook, etc.) once the vehicle reaches it. After coupling, in some embodiments, cable 104 is reeled in.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A recovery method comprising:
   causing a first vehicle to move along a first circular path having a first radius;
   deploying a cable from the first vehicle, wherein the cable has a physical adaptation that generates a laterally-directed force that causes the cable to extend radially inward from the first circular path, wherein a free end of the cable circumscribes a second circular path as the first vehicle moves along the first circular path, and wherein the second circular path has a second radius that is smaller than the first radius;
   attracting a second vehicle to the free end of the cable; and
   coupling the second vehicle to the cable.

2. The method of claim 1 wherein the first vehicle and the second vehicle are aircraft.

3. The method of claim 2 wherein the second vehicle is an unmanned aerial vehicle.

4. The method of claim 1 wherein the first vehicle and the second vehicle are sea-faring vessels.

5. The method of claim 4 wherein the second vehicle is an unmanned underwater vehicle.

6. The method of claim 1 wherein the physical adaptation is a winglet that is coupled to the cable at a location that is proximal to the free end thereof.

7. The method of claim 6 wherein a transponder is disposed in the winglet, wherein the transponder broadcasts a signal that can be received by the second vehicle.

8. The method of claim 6 wherein the operation of coupling further comprises coupling the second vehicle to a hook that is proximal to the free end of the cable.

9. The method of claim 6 wherein the operation of coupling further comprises coupling the second vehicle to a capture rod that is proximal to the free end of the cable.

10. The method of claim 1 wherein the operation of attracting further comprises broadcasting a signal that can be received by the second vehicle, wherein the signal is broadcast from a region proximal to the free end of the cable.

11. The method of claim 1 wherein the first vehicle has a minimum controllable speed that is faster than a maximum sustained speed of the second vehicle.

12. The method of claim 1 wherein the operation of deploying further comprises deploying a sufficient length of cable such that the speed of the free-end of the cable is less than a maximum sustained speed of the second vehicle.

13. The method of claim 12 wherein the operation of deploying further comprises deploying a sufficient length of cable such that the following relation is satisfied:

$$V^S_{MAX} > V^{HV} \times (R^{DB}/R^{HV}),$$

wherein:
$V^S_{MAX}$ is the maximum sustained speed of the second vehicle;
$V^{HV}$ is the speed at which the first vehicle moves along the first circular path;
$R^{DB}$ is the second radius; and
$F^{HV}$ is the first radius.

14. The method of claim 1 and further comprising the operation of reeling in the cable after the second vehicle is coupled to the cable.

15. A recovery method comprising:
moving a first end of a cable in a first circular path, wherein the first end of the cable is moved at a first speed by a first vehicle;
generating a laterally-directed force by moving the cable through water or air, wherein the force causes a second, free end of the cable to extend radially inward of the first circular path thereby circumscribing a second circular path, wherein the free end of the cable moves at a second speed;
attracting, to the free end of the cable, a second vehicle having a maximum sustained speed that is less than the minimum controllable speed of the first vehicle; and
coupling the second vehicle and the free end of the cable together.

16. The method of claim 15 further comprising the operation of deploying the cable from the first vehicle.

17. The method of claim 16 wherein the operation of deploying further comprises deploying a length of cable that results in the second speed being less than the maximum sustained speed of the second vehicle.

18. The method of claim 16 and further wherein
the second circular path has a second radius that is smaller than a first radius of the first circular path, and further wherein a sufficient length of cable is deployed to satisfy the relation:

$$V^S_{MAX} > V^{HV} \times (R^{DB}/R^{HV}),$$

wherein:
$V^S_{MAX}$ is a maximum sustained speed of the second vehicle;
$V^{HV}$ is a speed at which the first vehicle moves along the first circular path;
$R^{DB}$ is the second radius; and
$R^{HV}$ is the first radius.

19. The method of claim 15 wherein a fixture is coupled proximal to the free end of the cable, wherein, as the first vehicle moves, the fixture generates a force that causes the cable to extend radially inward of the first vehicle.

20. The method of claim 15 wherein the operation of attracting the second vehicle to approach the free end of the cable further comprises broadcasting a signal that can be received by the second vehicle, wherein the signal is broadcast proximal to the free end of the cable.

* * * * *